(12) United States Patent
Akcaba et al.

(10) Patent No.: US 8,116,356 B2
(45) Date of Patent: Feb. 14, 2012

(54) LINEAR TRANSFORMATION MATRICES FOR DISTRIBUTED DIVERSITY

(75) Inventors: Cemal Akcaba, Zurich (CH); Patrick Kuppinger, Zurich (CH); Helmut Bölcskei, Zurich (CH); Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 895 days.

(21) Appl. No.: 12/214,634

(22) Filed: Jun. 20, 2008

(65) Prior Publication Data

US 2008/0317104 A1  Dec. 25, 2008

Related U.S. Application Data

(60) Provisional application No. 60/936,924, filed on Jun. 22, 2007.

(51) Int. Cl.
*H04B 3/36* (2006.01)
(52) U.S. Cl. ...................................... 375/211
(58) Field of Classification Search .................. 375/211, 375/214, 260; 370/430
See application file for complete search history.

(56) References Cited

U.S. PATENT DOCUMENTS

| | | | |
|---|---|---|---|
| 7,796,630 B2 * | 9/2010 | Orlik et al. | 370/430 |
| 2007/0230605 A1 * | 10/2007 | Osseiran et al. | 375/260 |
| 2009/0143008 A1 * | 6/2009 | Hottinen et al. | 455/11.1 |

OTHER PUBLICATIONS

J. N. Laneman and G. W. Wornell, "An Efficient Protocol for Realizing Distributed Spatial Diversity in Wireless Ad-Hoc Networks," in Proc. ARL FedLab Symp. on Adv. Telecomm. & Inform. Distrib. Prog. (ATIRP), College Park, MD, Mar. 2001.*

A. Bletsas, A. Khisti, D. P. Reed, and A. Lippman, "A simple cooperative diversity method based on network path selection," IEEE J. Sel. Areas Commun., vol. 24, pp. 659-672, 2006.*

Kaim G.Seddik, K. J. Ray Liu, "Distributed Space-Frequency Coding over Broadband Relay Channels", IEEE Trans. Wireless Communications, vol. 7, No. 11, pp. 4748-4759, Nov. 2008.*

(Continued)

*Primary Examiner* — Jaison Joseph
(74) *Attorney, Agent, or Firm* — Harrington & Smith (57) ABSTRACT

A signal for relay is received from a first node. From a local memory that stores K transform matrices (K being an integer greater than one) is selected a transform matrix that is associated with a relay rank order. The matrices define an optimal tradeoff of diversity gain versus spatial multiplexing. The received signal is transformed using the selected transform matrix, and the transformed signal is relayed over a wireless channel to a second node. In a particular embodiment the received signal is an input symbol vector of N consecutive symbols (N being an integer at least equal to two) and the transform linearly combines the N symbols of the input vector according to the relay rank order. In various embodiments the first node may give the rank order, it may be mutually agreed via signaling among the various relay nodes, or it may be based on an intrinsically generated random number.

32 Claims, 4 Drawing Sheets

OTHER PUBLICATIONS

Yabo Li and X.-G. Xia, A Family of Distributed Space-Time Trellis Codes with Asynchronous Cooperative Diversity, IEEE Trans. on Communications, Apr. 2007. Its short version is published in Proc. of ISIT'05, Adelaide, Australia, Sep. 4-9, 2005.*

Akcaba, Cemal et al.; "Distributed Transmit Diversity in Relay Networks", Information Theory for Wireless Networks, 2007 IEEE Information Theory Workshop, PI, Jul. 1, 2007, pp. 1-5, XP031137107.

Laneman, J.N. et al., "Distributed Space—Time-Coded Protocols for Exploiting Cooperative Diversity in Wireless Networks", IEEE Transactions on Information Theory, vol. 49, No. 10, Oct. 2003, pp. 2415-2425.

Hammerström, M.K. et al., "Cooperative Diversity by Relay Phase Rotations in Block Fading Environments", Fifth IEEE Workshop on Signal Processing Advances in Wireless Communications, Lisboa, Partugal, Jul. 11-14, 2004, 5 pgs.

Azarian, K. et al., "One the Achievable Diversity—Multiplexing Tradeoff in Half-Duplex Cooperative Channels", IEEE Transactions on Information Theory, vol. 51, No. 12, Dec. 2005, pp. 4152-4172.

Slimane, S.B. et al., "Relay Communication with Delay Diversity for Future Communication Systems", © 2006 IEEE, 5 pgs.

* cited by examiner

$$G_1 = \begin{bmatrix} 1 & 0 & 0 \\ 0 & 1 & 0 \\ 0 & 0 & 1 \end{bmatrix} \quad G_2 = \begin{bmatrix} 0 & 1 & 0 \\ 0 & 0 & 1 \\ 1 & 0 & 0 \end{bmatrix} \quad G_3 = \begin{bmatrix} 0 & 0 & 1 \\ 1 & 0 & 0 \\ 0 & 1 & 0 \end{bmatrix}$$

$<G_i, G_j> = 0$ for $i \neq j$

LINEAR TRANSFORMATION MATRICES FOR DISTRIBUTED DIVERSITY

CLAIM OF PRIORITY FROM A CO-PENDING PROVISIONAL PATENT APPLICATION

This patent application claims priority under 35 U.S.C. §119(e) from Provisional Patent Application No. 60/936,924, filed Jun. 22, 2007, the contents of which is incorporated by reference herein in its entirety, including the appendices attached thereto.

TECHNICAL FIELD

The teachings herein relate generally to relay networks using wireless relay nodes between a source and destination, and specifically relate to linear processing techniques at the relays to achieve diversity-multiplexing benefits.

BACKGROUND

The following abbreviations are herewith defined:
3GPP third generation partnership project
CSI channel state information
DM diversity multiplexing
DVB-H digital video broadcast for handheld devices
eNB evolved node B (of an LTE system)
E-UTRAN evolved UTRAN
i.i.d independent and identically distributed
LTE long term evolution of 3GPP
MI mutual information
Node B base station or similar network access node
UE user equipment (e.g., mobile equipment/station)
UMTS universal mobile telecommunications system
UWB ultra wideband
UTRAN UMTS terrestrial radio access network
WiMAX world interoperability for microwave access Wireless relay networks are the environment of this invention, such as for example WiMAX, E-UTRAN (also known as 3.9G), UWB systems and DVB-H. Wireless relaying is assumed to offer benefits such as easy and fast network deployment, low cost of installation and maintenance, flexibility, and scalability in both size and density. Coverage probability increases exponentially with the number of relay nodes in the network. Additionally, the use of multiple relays for a single message increases diversity in the signal.

Relevant treatment in the prior art similar to the system model described herein, J. Nicholas Laneman and Gregory W. Wornell [DISTRIBUTED SPACE-TIME-CODED PROTOCOLS FOR EXPLOITING COOPERATIVE DIVERSITY IN WIRELESS NETWORKS; *IEEE Transactions on Information Theory*, vol. 49, no. 10, pp. 2415-2425, October 2003] propose space-time coded cooperative diversity protocols achieving full spatial diversity gain (i.e., the diversity order equals the number of relay terminals). Further, Y. Jing and B. Hassibi [DISTRIBUTED SPACE-TIME CODING IN WIRELESS RELAY NETWORKS; *IEEE Transactions on Wireless Communication*, vol. 5, no. 12, pp 3524-2536, December 2006] analyze distributed linear dispersion space-time coding schemes and show that a diversity order equal to the number of relay terminals can be achieved. In a work by Kambiz Azarian, Hesham el Gamal and Philip Schniter [ON THE ACHIEVABLE DIVERSITY-MULTIPLEXING TRADEOFF IN HALF-DUPLEX COOPERATIVE CHANNELS; *IEEE Transactions on Information Theory*, vol. 51, no. 12, pp. 4152-4172, December 2005], the presence of a direct link between source and destination is assumed, and it is shown that an extension (to the multi-relay case) previously introduced in R. U. Nabar, H. Bolcskei, and F. W. Kneubuhler [FADING RELAY CHANNELS: PERFORMANCE LIMITS AND SPACE-TIME SIGNAL DESIGN; *IEEE J. Selected Areas of Communication*, vol. 22 no. 6, pp 1099-1109, August 2004] is diversity-multiplexing (DM) tradeoff optimal.

SUMMARY

According to an exemplary embodiment of the invention is a method that includes receiving from a first node a signal for relay, selecting from a local memory that stores K transform matrices a transform matrix associated with a relay rank order (wherein K is an integer greater than one), transforming the received signal using the selected transform matrix, and relaying the transformed signal over a wireless channel to a second node. The K transform matrices define an optimal tradeoff of diversity gain versus spatial multiplexing for any two or more of the K transform matrices.

According to another exemplary embodiment of the invention is an apparatus that includes a receiver, a memory, a processor and a transmitter. The receiver is configured to receive from a first node a signal for relay. The memory is configured to store (does store) K transform matrices (K is an integer greater than one). The processor is configured to select from the local memory one of the K transform matrices that is associated with a relay rank order, and to transform the received signal using the selected transform matrix. And the transmitter is configured to relay the transformed signal over a wireless channel to a second node. The K transform matrices define an optimal tradeoff of diversity gain versus spatial multiplexing for any two or more of the K transform matrices.

According to another exemplary embodiment of the invention is a memory embodying a program that is executable by a processor to perform actions directed toward relaying a signal. In this embodiment the actions include, in response to receiving from a first node a signal for relay, selecting from a local memory that stores K transform matrices a transform matrix that is associated with a relay rank order (K being an integer greater than one), and transforming the received signal using the selected transform matrix, and then relaying the transformed signal over a wireless channel to a second node. The K transform matrices define an optimal tradeoff of diversity gain versus spatial multiplexing for any two or more of the K transform matrices.

According to another exemplary embodiment of the invention is an apparatus that includes receive means (e.g., a receiver of a transceiver), memory means (e.g., a computer readable memory), processing means (e.g., a digital processor) and sending means (e.g., a transmitter of the transceiver). The receive means is for receiving from a first node a signal for relay. The memory means is for storing K transform matrices (K being an integer greater than one). The processing means is for selecting from the memory means one of the K transform matrices that is associated with a relay rank order, and for transforming the received signal using the selected transform matrix. And the sending means is for relaying the transformed signal over a wireless channel to a second node. The K transform matrices define an optimal tradeoff of diversity gain versus spatial multiplexing for any two or more of the K transform matrices.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION OF EMBODIMENTS OF THE INVENTION

Embodiments of this invention are particularly advantageous for use in a relay system, though such embodiments are not limited to any particular wireless relay protocol and may be deployed in the exemplary WiMAX, E-UTRAN etc. network protocols noted above as well as others. Below are analyzed fading relay networks, where a single-antenna source-destination terminal pair communicates through a set of half-duplex single-antenna relays using a two-hop protocol (source-relay-destination) with linear processing at the relay level. A family of relaying schemes is presented which achieves the entire optimal diversity-multiplexing (DM) tradeoff curve. As a byproduct of the below analysis, it follows that delay diversity and phase-rolling at the relay level are optimal with respect to the entire DM-tradeoff curve, provided the delays and the modulation frequencies, respectively, are chosen appropriately. Importantly, in embodiments of this invention the different relays used to relay the same message/communication transmit simultaneously, but the order of their transmissions (symbols) differs among one another to preserve the desired diversity.

Figure 1:
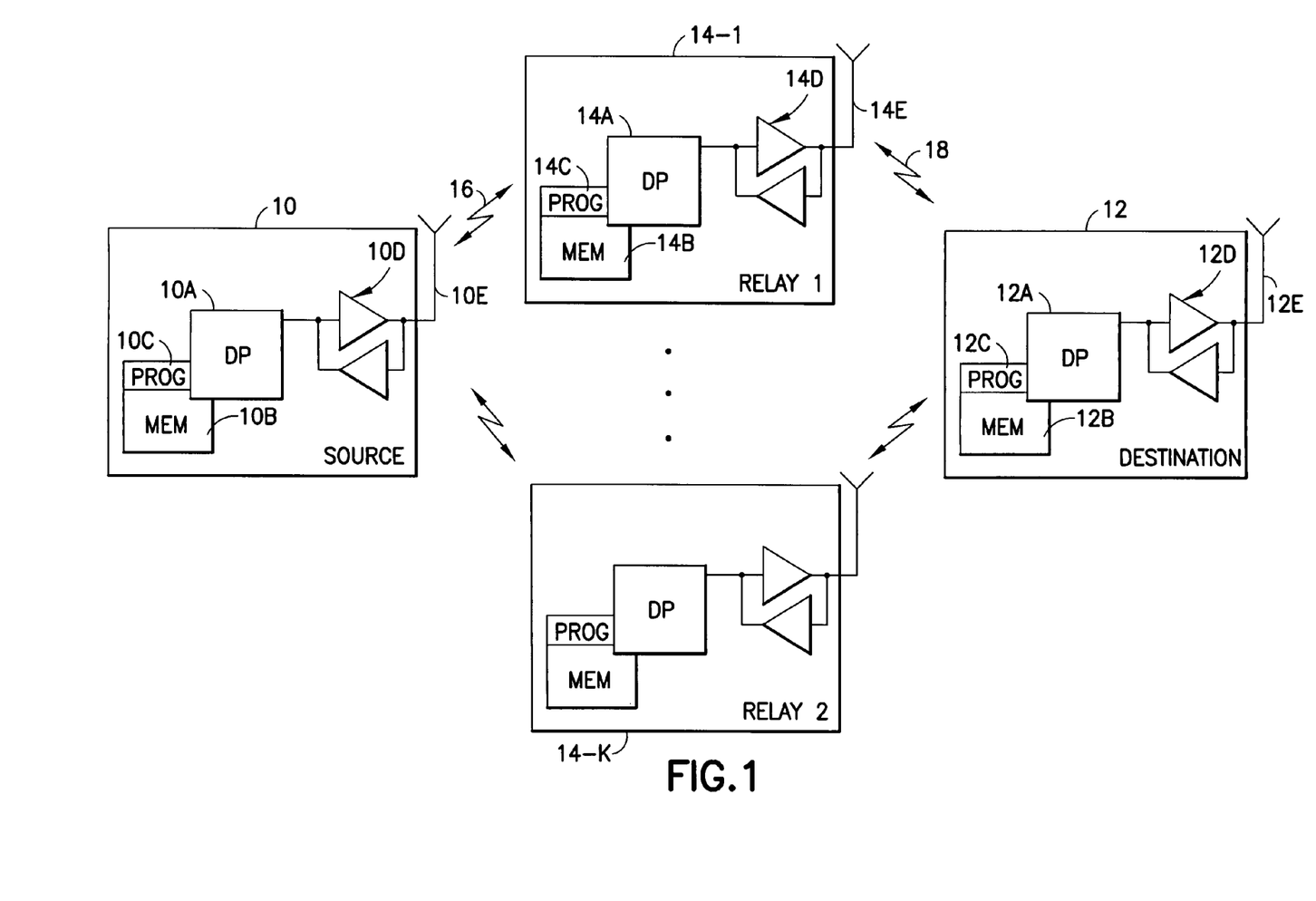
FIG. 1 shows a simplified block diagram of various electronic devices that are suitable for use in practicing the exemplary embodiments of this invention

Reference is made first to FIG. 1 for illustrating a simplified block diagram of various electronic devices that are suitable for use in practicing the exemplary embodiments of this invention. In FIG. 1 a wireless network is adapted for communication between a source 10 and a destination 12 through K wireless relay nodes 14-1, 14-K. The source 10 and the destination 12 may be a user equipment UE and a network node B/base station BS for example, in either order, or they both may be UEs in an ad hoc network that uses relays. Communications from the source 10 flow through each of the relays 14-1, 14-K, which each re-transmit to the destination 14. While not considered in detail below, there may also be a direct link between the source 10 and the destination 14, which adds diversity to the overall scheme but that diversity is additive to the advantages detailed below respecting the relays 14-1, 14-K. Two identical relays are shown, but as will be evident from below any integer number K>1 of relays may be used to advantage using these teachings, with more relays adding more diversity. The relay nodes 14-1, 14-K need not be identical but may still process similarly according to these teachings. A relay node may be, for example, a mobile terminal or station, a fixed wireless node, or any of the various other implementations noted below.

Each of the relays 14-1, 14-K includes a digital processor (DP) 14A, a memory (MEM) 14B that stores a program (PROG) 14C, and a suitable radio frequency (RF) transceiver 14D for bidirectional wireless communications with the source 10 and the destination 14. Each of the source 10 and the destination 12 also includes a DP 10A/12A, a MEM 10B/12B that stores a PROG 10C/12C, and a suitable RF transceiver 10D/12D. The wireless source to relay link 16 and the relay to destination link 18 are shown as unidirectional since the description below is from source to destination, but the relays may be used by these teachings for bi-directional communications also or different relays may be used for different direction links between the source 10 and destination 12. The relays 14-1, 14-K, the source 10 and the destination 12 communicate over the wireless links 16, 18, each using one or more antennas 10E/12E/14E. While the model below characterizes single antenna relays 14-1/14-K as well as a single antenna source 10 and destination 12, MIMO techniques already known or yet to be developed may be used to further increase throughput through the system without departing from these teachings; a single antenna model is used so that the description can more clearly define the inventive aspects described herein. At least one of the PROGs 10C/12C/14C is assumed to include program instructions that, when executed by the associated DP, enable the electronic device to operate in accordance with the exemplary embodiments of this invention, as will be discussed below in greater detail.

Exemplary embodiments of this invention may be implemented by computer software executable by the DP 14A of the relay 14-1, 14-K and the other DPs, or by hardware, or by a combination of software and/or firmware and hardware.

In general, the various embodiments of the UE 10 and relays 14-1, 14-K can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B/12B/14B may be of any type suitable to the local technical environment and may be implemented using any suitable data storage technology, such as semiconductor-based memory devices, magnetic memory devices and systems, optical memory devices and systems, fixed memory and removable memory. The DPs 10A/12A/14A may be of any type suitable to the local technical environment, and may include one or more of general purpose computers, special purpose computers, microprocessors, digital signal processors (DSPs) and processors based on a multi-core processor architecture, as non-limiting examples.

Efficiently utilizing the available distributed spatial diversity in wireless networks is a challenging problem. The communication from source 10 to destination 12 is considered for a fading relay network, where a single-antenna source-destination terminal pair communicates through a set of K half-duplex single-antenna relays 14-1, 14-K. It is assumed that the source terminal 10 and the relays 14-1, 14-K do not have any channel state information (CSI), and the destination terminal 12 knows all channels in the network perfectly.

Below is considered a class of simple relaying schemes which is based on linear processing at the relay level 14-1, 14-K and hence converts the overall channel between the source 10 and the destination terminal 12 into a time, frequency or time-frequency selective single-input single-output (SISO) channel. This is attractive from an implementation point-of-view, as it allows one to realize distributed spatial diversity through the application of standard forward error correction coding over the resulting selective-fading SISO channel. The class of relaying schemes analyzed in this paper encompasses phase rolling [see I. Hammerstrom, M. Kuhn, and A. Wittneben, COOPERATIVE DIVERSITY BY RELAY PHASE ROTATIONS IN BLOCK FADING ENVIRONMENTS; *Proc. Fifth IEEE Workshop on Signal Processing Advances in Wireless Communications* (SWAPC), July 2004, pp. 293-297; and also P. Kuppinger, TRANSFORMATION OF DISTRIBUTED SPATIAL INTO TEMPORAL DIVERSITY BY RELAY PHASE ROTATIONS, *M. Sc. Thesis, Imperial College London*, September 2006] and cyclic delay diversity [S. B. Slimane and A. Osseiran, Relay Communication with Delay Diversity for Future Communication Systems; *Proc. IEEE VTC (Fall)*, September 2006, pp. 1-5] at the relay level. In Slimane and Osseiran it is concluded through simulations, that a K-relay cyclic delay diversity system can achieve a diversity gain of K. In Hammerstrom et al. it is demonstrated that phase-rolling at the relay level can achieve second-order diversity. Some general themes in the teachings below can be summarized as follows:

There is shown a broad family of relay transmit diversity schemes based on linear processing at the relay level.

While the (numerical) results in Hammerstrom et al. and Slimane et al. are for the case of fixed rate (i.e., the rate does not scale with SNR), sufficient condition is provided on the proposed class of relay transmit diversity schemes to be optimal with respect to (w.r.t.) the entire DM-tradeoff curve as defined in L. Zhang and D. N. C. Tse, DIVERSITY AND MULTIPLEXING: A FUNDAMENTAL TRADEOFF IN MULTIPLE-ANTENNA CHANNELS; *IEEE Trans. Inf. Theory*, vol. 49, no. 5, pp. 1073-1096, May 2003. The tools used to prove DM-tradeoff optimality are a method for computing the optimal DM-tradeoff curve in selective-fading channels, introduced in P. Coronel and H. Bolcskei, DIVERSITY-MULTIPLEXING TRADEOFF IN SELECTIVE FADING MIMO CHANNELS, *Proc. IEEE ISIT*, Nice, France [June 2007, to appear], and a set of techniques described in Azarian et al.

Figure 2:
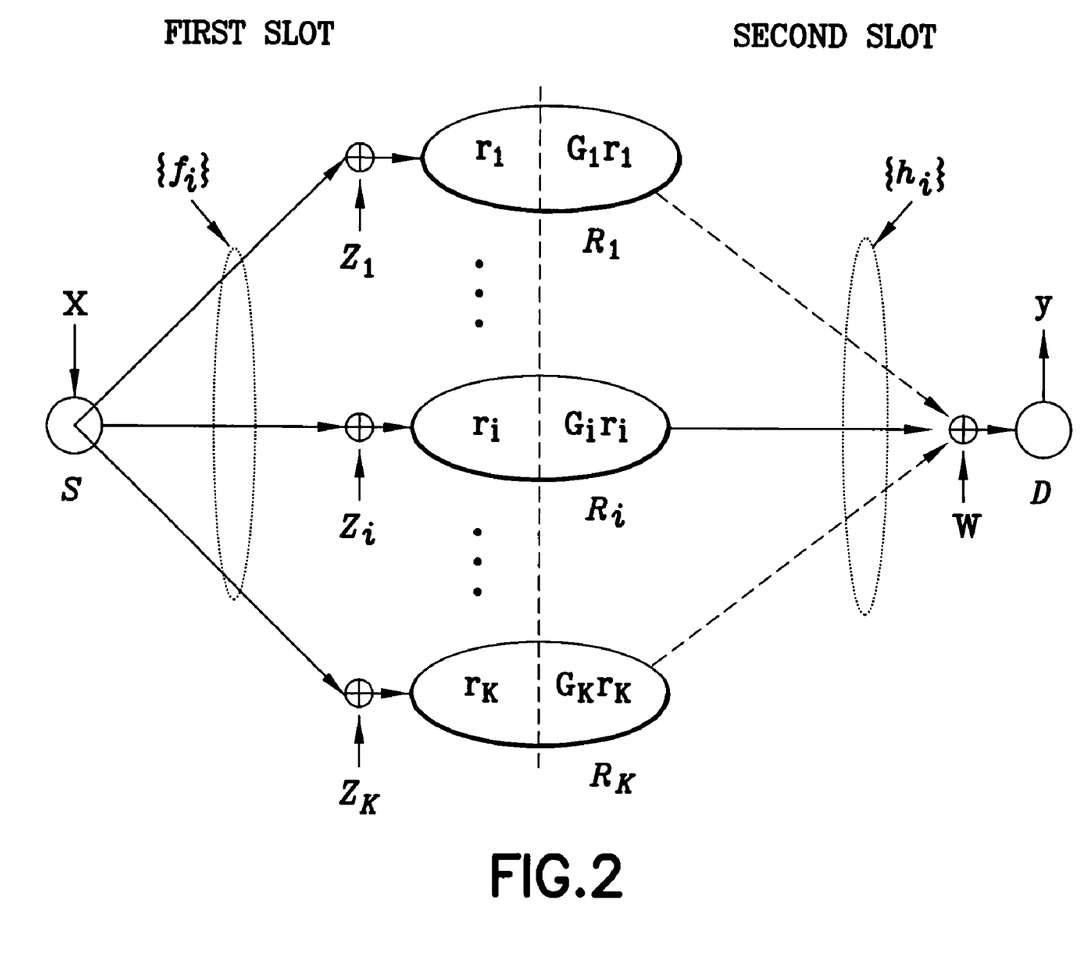
FIG. 2 is a schematic diagram of signals passing among the devices of FIG. 1 according to the system model analyzed and explained below.

The notation used to describe aspects of the invention below are as follows (see FIG. 2). The superscripts $^{T,H}$ and * stand for transpose, conjugate transpose, and conjugation, respectively. The term $x_i$ represents the i th element of the column vector x, and $[X]_{i,j}$ stands for the element in the i th row and j th column of the matrix X. X∘Y denotes the Hadamard product of the matrices X and Y. The term rank(X) stands for the rank of X. Tr(X) and $=\|X\|_F$ denote the trace and the Frobenius norm of X, respectively. $I_N$ is the N×N identity matrix. 0 denotes the all zeros matrix of appropriate size. The square matrices X and Y are orthogonal to each other if ⟨X, Y⟩=Tr(XY$^H$)=0. All logarithms are to the base 2. The term diag($a_1, a_2, \ldots, a_N$) denotes the N×N diagonal matrix with $a_i$ on diagonal entry i. The N×N discrete Fourier transform (DFT) matrix F is defined as $$[F]_{l,n} = \frac{1}{\sqrt{N}} e^{-j\frac{2\pi}{N}(l-1)(n-1)}.$$

The term X~CN(0,σ$^2$) stands for a circularly symmetric complex Gaussian random variable (RV) with variance σ$^2$. Let the positive RV X be parameterized by ρ>0. The exponential order of X in ρ is defined as $$v = -\frac{\log X}{\log \rho}.$$

$f(\rho) \doteq g(\rho)$ denotes exponential equality, in ρ, of the functions $f(\bullet)$ and $g(\bullet)$, i.e., $$\lim_{\rho \to \infty} \frac{\log f(\rho)}{\log \rho} = \lim_{\rho \to \infty} \frac{\log g(\rho)}{\log \rho}.$$

The symbols $\dot{\geq}$, $\dot{\leq}$, $\dot{>}$ and $\dot{<}$ are defined analogously.

Consider a wireless network with K+2 single-antenna terminals, where a source terminal S 10 communicates with a destination terminal D 12 through a set of K half-duplex relay terminals $R_i$ (i=1, 2, ..., K) 14-1 through 14-K. For the sake of simplicity but not as a limiting factor to the invention herein, assume that there is no direct link between S and D. The channels (A→B denotes the link between terminals A and B) S→$R_i$, with fading coefficient $f_i$, and $R_i$→D, with fading coefficient $h_i$, (i=1, 2, ..., K), are independent and identically distributed (i.i.d.) CN (0,1) and remain constant over the time-scale of interest. Define the column vectors f=[$f_1 f_2 \ldots f_K$]$^T$ and h=[$h_1 h_2 \ldots h_K$]$^T$.

Communication takes place over two time slots, slots being used in its generic sense as a transmission time interval and not necessarily limited to only those wireless protocols that formally employ the term slots. In the first time slot, S 10 transmits N symbols consecutively. The relay terminals 14-1/14-K process the received length-N sequence using a linear transformation as described in the signal model below and transmit the result during the second time slot to D 12, while S 10 remains silent. It is assumed that S 10 and the relay terminals 14-1/14-K do not have CSI, whereas D 12 knows $f_i$, $h_i$ (i=1, 2, ..., K) perfectly. For simplicity, perfect synchronization of the entire network is assumed, and the impact of shadowing and pathloss is ignored. Throughout the derivations below is assumed that N≥K.

The signal model is as follows. The vectors x, $r_i$, y∈C$^N$ represent the transmitted signal, received signal at $R_i$, and received signal at D, respectively (see FIG. 2). The vector $r_i$, is given by $$r_i = \sqrt{\rho} f_i x + w_i, i=1,2, \ldots, K \quad (1)$$

where ρ denotes the average signal-to-noise ratio (SNR) (for all links) and $w_i$ is the N-dimensional noise vector at $R_i$, with i.i.d. CN(0, 1) entries. The $w_i$ are independent across i as well. The transmitted signal x obeys the constraint E{x$^H$x}=N.

The relay terminal $R_i$ applies a linear transformation according to $G_i r_i$, where the N×N matrix $G_i$ satisfies $$G_i G_i^H = \frac{1}{N} I_N,$$

scales the result and transmits the signal $$\sqrt{\frac{\rho}{1+\rho}} G_i r_i.$$

This ensures that the per-relay transmit power (per dimension) is given by ρ. We emphasize that enforcing a per-relay transmit power of ρ/K, which leads to a total transmit power (across relays) of ρ, does not change the main statements and conclusions below; it is an assumption used to more clearly show the invention but not a constraint on the invention's breadth.

The overall input-output relation reads $$y = \sum_{i=1}^{K} \frac{\rho}{\sqrt{\rho+1}} h_i f_i G_i x + \tilde{z} \quad (2)$$

where the effective noise term $\tilde{z}$ (when conditioned on h) is circularly symmetric complex Gaussian distributed with $E\{\tilde{z}|h\}=0$ and $E\{\tilde{z}\tilde{z}^H|h\}=N_o'I_N$ where $$N_0' = \left(1 + \frac{\rho}{\rho+1}\|h\|^2\right).$$

Since we will be interested in the mutual information (MI) between y and x under the assumption that D 12 knows all the channels in the network perfectly, we can divide equation (2) by $\sqrt{N_o'}$ to obtain the effective input-output relation $$y = \frac{\rho}{\sqrt{1+\rho(1+\|h\|^2)}} \sum_{i=1}^{K} h_i f_i G_i x + z \quad (3)$$

where z (when conditioned on h) is a circularly symmetric complex Gaussian noise vector with $E\{z|h\}=0$ and $E\{zz^H|h\}=I_N$.

Below the $\rho \to \infty$ case is considered, where $$\frac{\rho}{\sqrt{1+\rho(1+\|h\|^2)}} \approx \frac{\rho}{\sqrt{1+\|h\|^2}}.$$

With $$H_{eff} = \frac{1}{\sqrt{1+\|h\|^2}} \sum_{i=1}^{K} h_i f_i G_i,$$

the input-output relation (3) can be rewritten as $$y = \sqrt{\rho} H_{eff} x + z. \quad (4)$$

Under the assumptions noted above, it follows that the maximum MI of the effective channel in equation (4) is achieved by i.i.d. Gaussian codebooks. These codebooks are stored in the local MEMs of the various relays 14-1/14-K. The corresponding MI is given by $$I(y; x \mid H_{eff}) = \frac{1}{2N} \sum_{n=0}^{N-1} \log(1+\rho\lambda_n(H_{eff}H_{eff}^H)) \quad (5)$$

where the factor ½ is due to the half-duplex constraint.

The DM-tradeoff realized by a family (one at each SNR $\rho$) of codebooks $C_r$ with rate $R=r \log \rho$, where $r \in [0, \frac{1}{2}]$, is given by the function $$d(r) = -\lim_{\rho \to \infty} \frac{\log P_e(\rho, r)}{\log \rho}$$

where $P_e(\rho,r)$ is the error probability obtained through maximum likelihood (ML) decoding. We say that $C_r$ operates at multiplexing gain r. For a given SNR $\rho$, the codebook $C_r(\rho) \in C_r$ contains $\rho^{2Nr}$ codewords $x_i$.

Next, compute the optimal DM-tradeoff curve, as defined in Zheng and Tse, for the effective channel $H_{eff}$ and provide a sufficient condition on the matrices $G_i$ (i=1, 2, ..., K) in conjunction with a family of codebooks $lC_r$ ($r \in [0, \frac{1}{2}]$) to be DM-tradeoff optimal. Following the framework in Zheng and Tse, the probability of outage at multiplexing gain r and SNR $\rho$ may be defined as $$P_o(\rho,r) = P[I(y;x|H_{eff}) < r \log \rho]. \quad (6)$$

Directly analyzing equation (6) is challenging, as closed-form expressions for the eigenvalue distribution of $H_{eff}$ do not seem to be available. However, noting that $$I(y;x|H_{eff}) \leq I_J(y;x|H_{eff}) \quad (7)$$

where $$I_J(y; x \mid H_{eff}) = \frac{1}{2}\log\left(1 + \frac{\rho}{N}\sum_{n=0}^{N-1}\lambda_n(H_{eff}H_{eff}^H)\right) \quad (8)$$

$$= \frac{1}{2}\log\left(1 + \frac{\rho}{N}\blacklozenge H_{eff}\blacklozenge_F^2\right)$$

$$= \frac{1}{2}\log\left(1 + \frac{\rho}{N}\|H_{eff}\|_F^2\right).$$

The technique developed in Coronel and Bolcskei can be used to show that the DM-tradeoff corresponding to $I_J(y;x|H_{eff})$ equals that corresponding to $I(y;x|H_{eff})$. The significance of this result lies in the fact that the quantity $\|H_{eff}\|_F^2$ lends itself nicely to analytical treatment.

In the following, we will need the N×K code difference matrix defined as $$\Phi(\Delta x) = [G_1 \Delta x G_2 \Delta x \ldots G_K \Delta x] \quad (9)$$

where $\Delta x = \tilde{x} - \hat{x}$ denotes the code difference vector associated with the codewords $\tilde{x}, \hat{x}$. Our main result can now be summarized as follows.

Theorem 1. For the half-duplex relay channel in (4), the optimal DM-tradeoff curve is given by $$d(r) = K(1-2r), r \in [0, \frac{1}{2}]. \quad (10)$$

Figure 3:
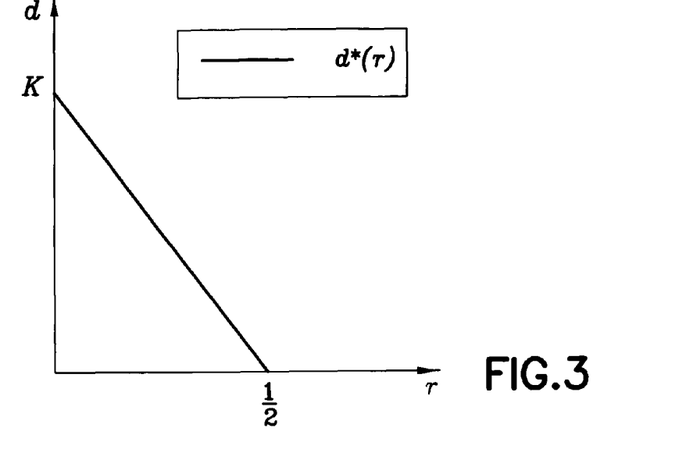
FIG. 3 is a graph showing that diversity d is a function of spatial multiplexing rate r and number K of relay nodes.

See FIG. 3 for the plot of equation (10). Let $\{G_1, G_2, \ldots, G_K\}$ be a set of transformation matrices and $C_r$ a family of codebooks such that for any codebook $C_r(\rho) \in C_r$ and any two codewords $\tilde{x}, \hat{x} \in C_r(\rho)$ the condition $\text{rank}(\Phi(\Delta x)) = K$ holds. Then, the ML decoding error probability satisfies $$P_e(\rho,r) \doteq \rho^{-d(r)}. \quad (11)$$

[For a proof of Theorem 1, see Appendix A attached to the priority document Provisional U.S. Patent Application No. 60/936,924.]

Figure 4:
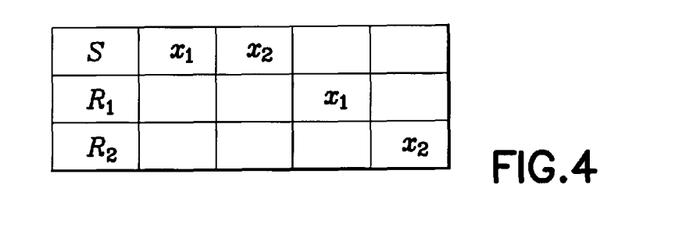
FIG. 4 is a timing chart according to a prior art approach showing relay node transmissions of two symbols $x_1$, $x_2$ in non-simultaneous time slots.

Theorem 1 shows that the DM-tradeoff properties of the half-duplex relay channel in equation (4) are equal to the "cooperative upper bound" (apart from the factor ½ loss, which is due to the half-duplex constraint) corresponding to a system with one transmit and K cooperating receive antennas. Noise forwarding at the relay level and the lack of cooperation, hence, do not impact the DM-tradeoff behavior, provided the matrices $G_i$ and the family of codebooks $C_r$ are chosen according to the conditions in Theorem 1. Azarian et al., assuming the presence of a direct link between source and destination, show that extending Protocol I in Nabar et al. to the multi-relay case by allowing only one relay to transmit in a given time slot yields DM-tradeoff optimality w.r.t. the entire DM-tradeoff curve. This is plotted at FIG. 4, where each of two relays $R_1$ and $R_2$ transmit only one of the symbols $x_1, x_2$, and each in different time slots as compared to the other relay. Our results show, however, that DM-tradeoff optimality can be obtained even if all relays transmit in all time slots as long as the full-rank condition in Theorem 1 is satisfied.

To derive the optimal tradeoff between the diversity gain and the spatial multiplexing gain that any scheme can achieve in the half-duplex Raleigh fading relay channel using linear processing techniques, assume that the relays use a set of linear processing matrices $\partial = \{G_1, G_2, \ldots, G_K\}$ that are orthogonal in the inner product space W defined by the inner product $\langle X, Y \rangle = tr(XY^H)$ such that $$\langle G_i, G_j \rangle = \begin{cases} N, & \text{for } i = j \\ 0, & \text{for } i \neq j \end{cases}.$$

As can be seen from the proof at Appendix A, to achieve full diversity it suffices for the following matrix to be full rank:

$$K = \begin{bmatrix} tr(G_1 G_1^H) & \ldots & tr(G_1 G_K^H) \\ tr(G_2 G_1^H) & \ldots & tr(G_2 G_K^H) \\ \vdots & \ddots & \vdots \\ tr(G_K G_1^H) & \ldots & tr(G_K G_{KL}^H) \end{bmatrix},$$

where $G_i$ is the processing matrix of relay i as before, and $K \leq N$.

Figure 5:
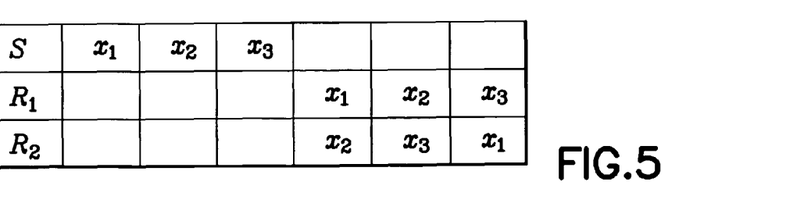
FIG. 5 is a timing chart similar to FIG. 4 but according to an embodiment of the invention whereby the relay nodes' transmissions of three symbols $x_1$, $x_2$, $x_3$ are in simultaneous time slots but cyclically shifted as compared to one another.
Figure 6:
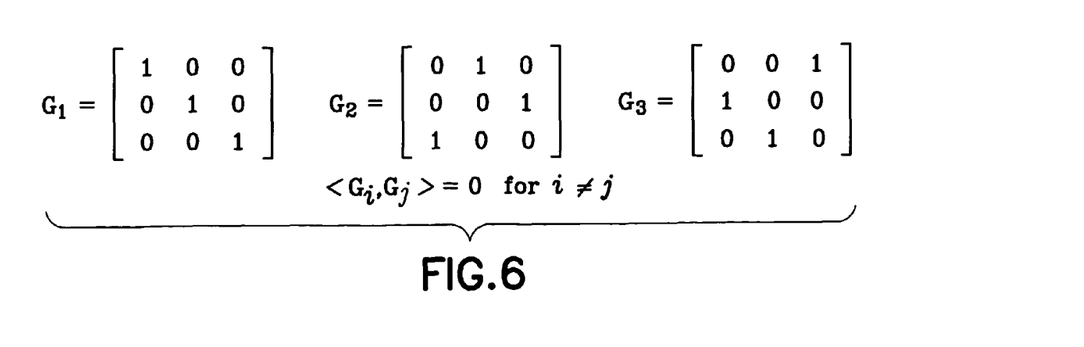
FIG. 6 is an illustration of matrices showing the array gain underlying the relay transmissions of FIG. 5.

That DM-tradeoff optimality can be obtained even if all relays transmit in all timeslots shown in FIG. 5, where the source 10 sends three symbols to each of the two relays $R_1$ and $R_2$, and those relays each transmit to the destination 12 one of the three symbols $x_1, x_2, x_3$, in a same slot as the other relay, only the rank condition (cyclic shift for FIG. 5) is satisfied, resulting in no single symbol being transmitted in the same slot by two different relays. FIG. 6 shows the mathematical construct for FIG. 5, where the transformation matrices $G_1$, $G_2$, and $G_3$ correspond to respective relays $R_1$, $R_2$, and $R_3$.

Another immediate conclusion that can be drawn from Theorem 1 is that cyclic delay diversity [see Slimane and Osseiran] and phase-rolling [see Hammerstrom et al. and Kuppinger] at the relay level are optimal w.r.t. the entire DM-tradeoff curve, provided the delays, the modulation frequencies and the codebooks are chosen appropriately. This can be seen as follows. We start by noting that the cyclic delay diversity scheme [Slimane and Osseiran] can be cast into our framework by setting $$G_i = \frac{1}{sqrtN} P_i$$

where $P_i$ denotes the permutation matrix that, when applied to a vector x, cyclically shifts the elements in x up by i−1 positions.

With $$\langle P_i, P_j \rangle = \begin{cases} N, & i = j \\ 0, & i \neq j \end{cases} \tag{12}$$

the condition $rank(\Phi(\Delta x)) = K$ takes a particularly simple form, namely $(F\Delta x)_k \neq 0$ for all $k \in \{1, 2, \ldots N\}$. To see this note that $rank(\Phi(\Delta x)) = rank(F\Phi(\Delta x))$ and $P_i = F^H \Lambda_i F$, where $$\Lambda_i = diag(e^{j\theta_i[0]}, e^{j\theta_i[1]}, \ldots e^{j\theta_i[N-1]}) \tag{13}$$

with $$\theta_i[n] = \frac{2\pi n(i-1)}{N}.$$

Next we have $$rank(F\Phi(\Delta x)) = rank(\Sigma[I_1, I_2, \ldots I_k]) \tag{14}$$

where $\Sigma = diag((F\Delta x)_1, (F\Delta x)_2, \ldots (F\Delta x)_N)$ and $[I_i]_k = e^{j\theta_i[k-1]}$, $k=1, 2, \ldots N$; $i=1, 2, \ldots K$. As a consequence of equation (12), the columns of the matrix $[l_1 l_2 \ldots l_K]$ are orthogonal and hence $rank(F\Phi(\Delta x)) = K$ if $\Sigma$ has full rank which is the case if $(F\Delta x)_k \neq 0$ for all $k \in \{1, 2, \ldots, N\}$.

In the case of phase-rolling [see Hammerstrom et al. and Kuppinger], we have $$G_i = \frac{1}{\sqrt{N}} \Lambda_i.$$

Again, the condition $rank(\Phi(\Delta x)) = K$ takes a particularly simple form, namely $(\Delta x)_k \neq 0$ for all $k \in \{1, 2, \ldots, N\}$. The proof of this statement follows by considering $\Phi(\Delta x)$ directly, putting rank $(\Phi(\Delta x))$ into the form of the right-hand side of equation (14) and applying the remaining steps in the argument for the cyclic delay diversity case. While the (numerical) results in Slimane and Osseiran and also in Hammerstrom et al. are for the r=0 case, the analysis presented herein reveals optimality of cyclic delay diversity and phase-rolling for the entire DM-tradeoff curve, provided the codebooks satisfy the full-rank condition in Theorem 1. We finally note that cyclic delay diversity and phase-rolling are time-frequency duals of each other in the sense that the linear transformation matrices for the two schemes obey $$G_i = \frac{1}{\sqrt{N}} F P_i F^H.$$

Relation to approximately universal codes [see S. Tavildar and P. Viswanath, APPROXIMATELY UNIVERSAL CODES OVER SLOW FADING CHANNELS; *IEEE Trans. Inf. Theory*, vol. 52, no. 7, pp. 3233-3258, July 2005]. For the half-duplex relay channel investigated herein, a family of codes $C_r$ is DM-tradeoff optimal if $$\mu_{min}(\rho) \dot{>} \rho^{-2r} \tag{15}$$

where $\mu min(\rho)$ is the smallest eigenvalue of $(\Phi(\Delta x))^H \Phi(\Delta x)$ over all $\Delta x = \tilde{x} - \hat{x}$ with $\tilde{x}, \hat{x} \in C_r(o)$. This result follows immediately from (32) in the proof of Theorem 1 (see Appendix A).

Based on equation (15), we can conclude (using the same arguments as in Sec. IV. A in Coronel and Bolcskei) that any family of codes $C_r$ satisfying equation (15) will also be approximately universal in the sense of Tavildar and Viswanath (Theorem 3.1).

Relation to code design criteria for point-to-point case. Note that the conditions of Theorem 1 guarantee DM-tradeoff optimality in point-to-point multiple-input single-output systems as well, and for four other linear relay processing schemes with rank(K)=1, 2, 3, and 4, respectively, and non-zero spread of the positive eigenvalues of K. Both the cyclic delay diversity scheme and the scheme with rank(K)=4 achieve a diversity order of 4. However, the delay diversity scheme offers slightly better performance indicating that orthogonality between the $G_i$ improves performance. Moreover, the numerical results suggest that the diversity order achieved by the other schemes is given by rank(K).

The above shows that a family of linear relay processing schemes achieving the optimal DM-tradeoff curve of half-duplex relay channels. Cyclic delay diversity and phase-rolling are shown to be (DM-tradeoff optimal) special cases. These teachings can be readily extended to account for the presence of a direct link between the source 10 and the destination terminals 12. Finally, the DM-tradeoff framework seems to be too crude to quantify potential performance differences between relay transmit diversity schemes with different eigenvalue spread of the Gramian matrix of the $G_i$.

As is evident from above then, embodiments of the invention include a device such as a relay node, a method, and a computer program product embodied on a computer readable memory and readable/executable by a processor for receiving from a source or from another relay a signal, for determining from a memory a transformation matrix associated with a relay rank order, for transforming the received signal according to the transformation matrix, and for relaying the transformed signal to a destination or to another relay. The rank order assures that no two relays use the same transformation matrix, and the transformation matrix may cyclically shift the symbols of the received signal, may rotate in phase those symbols, or otherwise shift them as compared to transformation matrices currently in use by other relays operating on the same source signal in the same time slot.

The relays may determine the transformation matrix to use from signaling received from the source, by mutual agreement/signaling among the relays themselves, or by intrinsic methods such as selecting a rank based on, for example a randomly generated number or a number generated from a unique relay identifier (e.g., international mobile serial number IMSI). In this paradigm, the intrinsic method assigns a rank to any random relay so that statistically the odds of two relays operating on the same signal concurrently and also using the same transformation matrix/rank order is less than one in $K_{max}$, where $K_{max}$ is the total number of unique transformation matrices/rank orders in the software from which the relay selects its appropriate matrix. The cited references include further techniques as to how each relay may determine its rank and thereby which transform matrix it is to use for a given communication.

Figure 7:
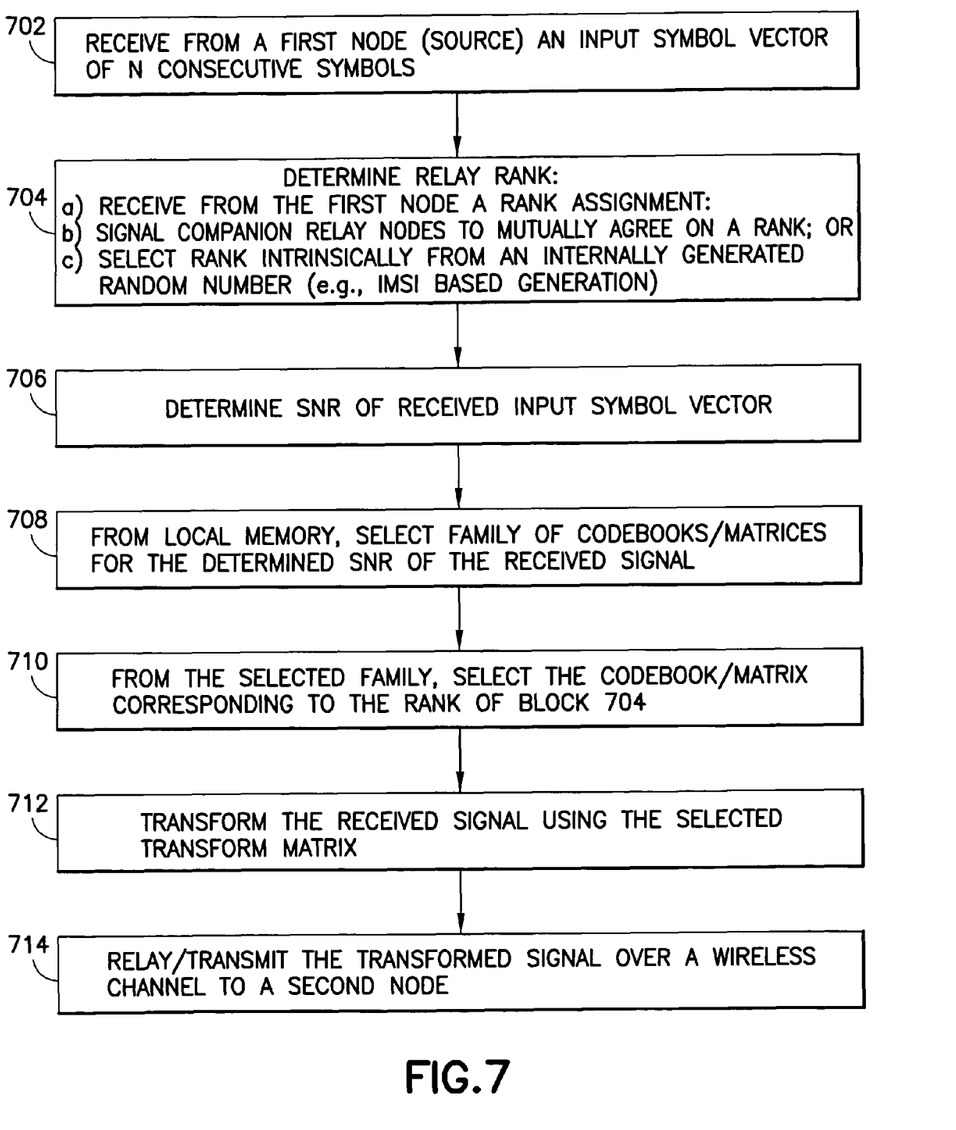
FIG. 7 is a process flow diagram according to an exemplary embodiment of the invention.

FIG. 7 is a process flow diagram showing process steps according to an exemplary embodiment of the invention from the perspective of a single relay node. Note that these steps need not be performed all in the order given at the figure. For example, the rank at block 704 may be determined prior to the time the signal is received from the first node or after the matrix family is identified at block 708, and/or the SNR of block 706 may be computed when the signal is first received at block 702 rather than after rank determination at block 704.

As above, the relay node may be embodied as a portable device such as a user equipment/mobile terminal, a portable device under control of the network (e.g., train-mounted), or a fixed network node operating as a network relay under control of a network base station/nodeB. At block 702 the relay receives from a first node (e.g., the source or some intermediary relay) an input symbol vector of N consecutive symbols (N being an integer greater than two). At block 704 the relay node determines its rank for relaying this input vector (or for all input vectors from the first node until channel conditions change appreciably). Three options are shown for how it determines its rank: the first node can signal a rank assignment to the relay, the various relays may signal one another an mutually agree on rankings, or each relay may individually determine its rank based on some random number generation technique, such as the IMSI based technique noted above. At block 706 the relay determines the SNR $\rho$ of the received signal.

Continuing at block 708 the relay selects that family of codebooks/matrices corresponding to the SNR of the received signal. In the local memory are stored families of codebooks/transform matrices where each family is associated with a SNR range of received signals. This aids in maximizing throughput, equalizing relay transmit power, and optimizing the DM curve for a given received signal. With the rank identified from block 704 and the codebook/matrix family identified at block 708, then at block 710 the relay selects from the memory the appropriate codebook/transform matrix for its rank and for the SNR of the received signal. The relay transforms at block 712 the received signal at block 712, which linearly re-orders (delay diversity) and/or phase rolls (phase shifts) the N received signals according to the rank, and at block 714 the relay transmits/relays the transformed signal to a second node (the destination or an intermediate relay). Each rank matrix per family is a different combination of phase and delay across the totality of the N symbols, so the companion relays relaying the same signal from the first node each will transmit their relayed signal with at least one symbol differing in delay or phase as compared to other relays.

Note that the above description refers to K relays and K rank-matrices/codebooks per SNR family. This is for simplicity of description only and is not to imply that in practice there must be an actual relay for each of the K rank-matrices of the SNR family that are stored in the local memory. For example, advantages are realized where there are K=5 rank matrices in memory for an SNR family but only two relays are involved in the actual relaying of signals from source to destination. In exemplary embodiments, there may be more or less than K relays participating in relaying a particular communication. Where there are more relays than K matrices for the SNR family stored in the memory, there will be at least two relays using the same rank-matrix (assuming all relays receive the signal with the same SNR, which will not always be true). While those relays employing the same rank-matrix may represent a repetition of their transmission, those different relay transmissions to the destination still exhibit spatial diversity. But regardless of that spatial diversity, in certain instances this might still be preferable to employing a high volume of relay-selection control signalling to avoid that repetition.

Embodiments of this invention may be implemented by computer software executable by a data processor of the relay node 14-1/14-K, such as the processor 14A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:

1. A method comprising:
    receiving from a first node a signal for relay;
    selecting from a local memory that stores K transform matrices a transform matrix associated with a relay rank order, wherein K is an integer greater than one and the K transform matrices define an optimal tradeoff of diversity gain versus spatial multiplexing for any two or more of the K transform matrices;
    transforming the received signal using the selected transform matrix; and
    relaying the transformed signal over a wireless channel to a second node.

2. The method of claim 1, wherein the received signal comprises an input symbol vector of N consecutive symbols where N is an integer at least equal to two; and wherein transforming the received signal using the selected transform matrix comprises linearly combining the N symbols of the input vector according to the relay rank order.

3. The method of claim 2, wherein at least two of the K transform matrices provide for a different re-ordering of the N symbols, each different re-ordering being different still from the order of the received N consecutive symbols.

4. The method of claim 2, wherein at least two of the K transform matrices provide for a different phase shifting the N symbols, each different phase shifting being different still from the phases of the received N consecutive symbols.

5. The method of claim 2, wherein the K transform matrices are a first family of transform matrices associated in the local memory with a signal to noise ratio $\rho$, and where the local memory further stores additional families of transform matrices for different signal to noise ratios; and wherein selecting from the local memory that stores the K transform matrices comprises first selecting the first family of transform matrices based on the signal to noise ratio of the received signal then selecting the transform matrix from the selected family that is associated with the relay rank order.

6. The method of claim 5, wherein each transform matrix within any one of the families is embodied as a codebook $C_r$ for a same-rate $R=r \log \rho$ encoding, where r is a multiplexing gain.

7. The method of claim 5, wherein each family of transform matrices optimizes diversity multiplexing with other relays of other relay rank orders for the signal to noise ratio of that codebook family.

8. The method of claim 1, wherein the selecting is based on one of:
    an assigned rank received from the first node;
    a rank mutually agreed via signaling with other relay nodes relaying between the first and second nodes; and
    an intrinsically generated random number.

9. The method of claim 1, wherein at least one of the K matrices is not a cyclic shift matrix.

10. The method of claim 1, wherein at least one of the K matrices is not a phase rotation matrix.

11. An apparatus comprising:
    a receiver configured to receive from a first node a signal for relay;
    a memory configured to store K transform matrices, wherein K is an integer greater than one and the K transform matrices define an optimal tradeoff of diversity gain versus spatial multiplexing for any two or more of the K transform matrices;
    a processor configured to select from the local memory one of the K transform matrices that is associated with a relay rank order, and to transform the received signal using the selected transform matrix; and
    a transmitter configured to relay the transformed signal over a wireless channel to a second node.

12. The apparatus of claim 11, wherein the received signal comprises an input symbol vector of N consecutive symbols where N is an integer at least equal to two; and wherein the processor is configured to transform the received signal using the selected transform matrix by linearly combining the N symbols of the input vector according to the relay rank order.

13. The apparatus of claim 12, wherein at least two of the K transform matrices provide for a different re-ordering of the N symbols, each different re-ordering being different still from the order of the received N consecutive symbols.

14. The apparatus of claim 12, wherein at least two of the K transform matrices provide for a different phase shifting the N symbols, each different phase shifting being different still from the phases of the received N consecutive symbols.

15. The apparatus of claim 12, wherein the K transform matrices are a first family of transform matrices associated in the memory with a signal to noise ratio $\rho$, and where the local memory is further configured to store additional families of transform matrices for different signal to noise ratios; and wherein the processor is configured to select the one transform matrix from the memory by first selecting the first family of transform matrices based on the signal to noise ratio of the received signal and then selecting the transform matrix from the selected family that is associated with the relay rank order.

16. The apparatus of claim 15, wherein each transform matrix within any one of the families is embodied in the memory as a codebook $C_r$ for a same-rate $R=r \log \rho$ encoding, where r is a multiplexing gain.

17. The apparatus of claim 15, wherein each family of transform matrices optimizes diversity multiplexing with other relay apparatuses of other relay rank orders for the signal to noise ratio of that codebook family.

18. The apparatus of claim 11, wherein the processor is configured to select the one transform matrix based on one of:
an assigned rank received at the receiver from the first node;
a rank mutually agreed via signaling with other relay nodes relaying between the first and second nodes; and
an intrinsically generated random number.

19. The apparatus of claim 11, wherein at least one of the K matrices is not a cyclic shift matrix.

20. The apparatus of claim 11, wherein at least one of the K matrices is not a phase rotation matrix.

21. A memory embodying a program that is executable by a processor to perform actions directed toward relaying a signal, the actions comprising:
in response to receiving from a first node a signal for relay, selecting from a local memory that stores K transform matrices a transform matrix associated with a relay rank order, wherein K is an integer greater than one and the K transform matrices define an optimal tradeoff of diversity gain versus spatial multiplexing for any two or more of the K transform matrices;
transforming the received signal using the selected transform matrix; and
relaying the transformed signal over a wireless channel to a second node.

22. The memory of claim 21, wherein the received signal comprises an input symbol vector of N consecutive symbols where N is an integer at least equal to two; and wherein transforming the received signal using the selected transform matrix comprises linearly combining the N symbols of the input vector according to the relay rank order.

23. The memory of claim 22, wherein at least two of the K transform matrices provide for a different re-ordering of the N symbols, each different re-ordering being different still from the order of the received N consecutive symbols.

24. The memory of claim 22, wherein at least two of the K transform matrices provide for a different phase shifting the N symbols, each different phase shifting being different still from the phases of the received N consecutive symbols.

25. The memory of claim 22, wherein the K transform matrices are a first family of transform matrices associated in the local memory with a signal to noise ratio $\rho$, and where the local memory further stores additional families of transform matrices for different signal to noise ratios; and wherein selecting from the local memory that stores the K transform matrices comprises first selecting the first family of transform matrices based on the signal to noise ratio of the received signal then selecting the transform matrix from the selected family that is associated with the relay rank order.

26. The memory of claim 25, wherein each transform matrix within any one of the families is embodied as a codebook $C_r$ for a same-rate $R=r \log \rho$ encoding, where r is a multiplexing gain.

27. The memory of claim 25, wherein each family of transform matrices optimizes diversity multiplexing with other relays of other relay rank orders for the signal to noise ratio of that codebook family.

28. The memory of claim 21, wherein the selecting is based on one of:
a rank assignment that is received from the first node;
a mutually agreed rank resulting from signaling with companion relays; and
an intrinsically generated random number.

29. The memory of claim 21, wherein at least one of the K matrices is not a cyclic shift matrix.

30. The memory of claim 21, wherein at least one of the K matrices is not a phase rotation matrix.

31. An apparatus comprising:
receive means for receiving from a first node a signal for relay;
memory means for storing K transform matrices, wherein K is an integer greater than one and the K transform matrices define an optimal tradeoff of diversity gain versus spatial multiplexing for any two or more of the K transform matrices;
processing means for selecting from the memory means one of the K transform matrices that is associated with a relay rank order, and for transforming the received signal using the selected transform matrix; and
sending means for relaying the transformed signal over a wireless channel to a second node.

32. The apparatus of claim 31, wherein:
the received signal comprises an input symbol vector of N consecutive symbols where N is an integer at least equal to two;
the processing means comprises a processor that is configured to transform the received signal using the selected transform matrix by linearly combining the N symbols of the input vector according to the relay rank order;
the receive means comprises a receiver and the sending means comprises a transmitter.

* * * * *